US012715155B2

(12) United States Patent
Peccetti et al.

(10) Patent No.: US 12,715,155 B2
(45) Date of Patent: Aug. 25, 2026

(54) CUTTING UNIT FOR SEPARATING ONE OR MORE BUNDLES WRAPPED WITH A CONTINUOUS WRAP

(71) Applicant: COLINES S.P.A., Novara (IT)

(72) Inventors: Francesco Peccetti, Novara (IT); Eraldo Peccetti, Novara (IT)

(73) Assignee: COLINES S.P.A., Novara (IT)

( * ) Notice: Subject to any disclaimer, the term of this patent is extended or adjusted under 35 U.S.C. 154(b) by 95 days.

(21) Appl. No.: 18/953,045

(22) Filed: Nov. 19, 2024

(65) Prior Publication Data

US 2025/0162185 A1 May 22, 2025

(30) Foreign Application Priority Data

Nov. 21, 2023 (IT) ........................ 102023000024615

(51) Int. Cl.

*B26D 7/06* (2006.01)
*B26D 5/08* (2006.01)
*B26F 3/12* (2006.01)
*B65B 61/10* (2006.01)

(52) U.S. Cl.

CPC ............... *B26D 7/06* (2013.01); *B26D 5/086* (2013.01); *B26F 3/12* (2013.01); *B65B 61/10* (2013.01)

(58) Field of Classification Search

CPC .............. B26F 3/12; B26D 7/10; B65B 61/10
See application file for complete search history.

(56) References Cited

U.S. PATENT DOCUMENTS 3,017,487 A * 1/1962 Priestly ..................... B26F 3/12 200/61.93
3,758,366 A * 9/1973 Ballestrazzi et al. ........................ B29C 66/1122 53/553

(Continued)

FOREIGN PATENT DOCUMENTS

| | | | |
|---|---|---|---|
| EP | 3414167 | A1 | 12/2018 |
| EP | 3601067 | A1 | 2/2020 |
| WO | 90/09316 | A1 | 8/1990 |

OTHER PUBLICATIONS

Italian Search Report received for IT Application No. IT 202300024615 on Nov. 21, 2023, 7 pgs.

*Primary Examiner* — Sean M Michalski
(74) *Attorney, Agent, or Firm* — Merchant & Gould P.C.

(57) ABSTRACT

A cutting unit separating bundles wrapped with a continuous wrap or cutting a flat film in dynamic transit includes a load-bearing structure supporting eccentric wheels hinged on opposite sides of the load-bearing structure and including an outer crown element idly coupled to an eccentric central plate. A heated cutting wire is fixed onto the outer crown element by pins, at a first circumferential portion of the eccentric wheels. A tensioning wire has an elastic compensation element and is fixed to the outer crown element by pins, at a second circumferential portion of the eccentric wheels, so an arc between pins of the first and second circumferential portions is less than 180°. The eccentric central plate is eccentrically fixed to a respective shaft, fixed to a pulley. The pulleys continuously and synchronously rotate to impart alternate motion perpendicular to a continuous wrap or flat film, between engagement and disengagement positions.

10 Claims, 12 Drawing Sheets

(56) References Cited

U.S. PATENT DOCUMENTS

| | | | | | |
|---|---|---|---|---|---|
| 3,782,070 | A * | 1/1974 | Erlandson | B65B 9/06 | 83/326 |
| 4,319,952 | A * | 3/1982 | Schjeldahl | B29C 66/8322 | 83/171 |
| 4,549,388 | A * | 10/1985 | Lancaster | B65B 51/225 | 53/210 |
| 4,608,893 | A * | 9/1986 | Huhne | B26D 1/553 | 83/171 |
| 4,683,791 | A * | 8/1987 | Demont | B29C 44/56 | 83/16 |
| 5,182,894 | A * | 2/1993 | Bate | B65B 61/10 | 53/399 |
| 6,039,830 | A * | 3/2000 | Park | H10P 72/74 | 83/73 |
| 6,832,538 | B1 * | 12/2004 | Hwang | B26D 3/008 | 83/788 |
| 2008/0184676 | A1 * | 8/2008 | Downhill | B65B 11/008 | 53/465 |
| 2009/0308965 | A1 * | 12/2009 | Piucci | B26D 7/0608 | 242/526 |
| 2009/0320659 | A1 * | 12/2009 | Lalloway | B26F 3/12 | 83/13 |
| 2013/0152749 | A1 * | 6/2013 | Salador | B26D 7/01 | 83/72 |
| 2016/0272352 | A1 * | 9/2016 | Read | B29C 65/787 | |
| 2018/0186026 | A1 * | 7/2018 | Annequin | B26F 3/12 | |
| 2018/0273217 | A1 * | 9/2018 | Bernardy | B29C 66/919 | |
| 2019/0366576 | A1 * | 12/2019 | Ascone | B26F 3/12 | |
| 2021/0086390 | A1 * | 3/2021 | Srinivasan | B26D 3/006 | |
| 2021/0114760 | A1 * | 4/2021 | Peccetti | B26D 1/095 | |
| 2025/0162185 | A1 * | 5/2025 | Peccetti | B26D 1/46 | |

* cited by examiner

CUTTING UNIT FOR SEPARATING ONE OR MORE BUNDLES WRAPPED WITH A CONTINUOUS WRAP

FIELD OF THE INVENTION

The present invention relates to a cutting unit for separating one or more bundles wrapped with a continuous wrap or for cutting flat film in dynamic transit.

BACKGROUND ART

Machines that "pack" bundles inside a stretch film are known and used, such as those described in patent EP 3414167, for example.

In these machines, for example, systems for cutting the film are used, such as those disclosed in EP3601067 to the present Applicant, which operate very well.

Moreover, if the systems of this patent consist of pluralities of modules to be coupled to the projection geometry of the bundle, they operate on a top area and a bottom area of the bundle wrapped with the film and must be appropriately synchronized with the continuous tube of film that advances wrapped onto the bundles, spaced apart from one another or not and contained in the continuous tube; otherwise, if applied individually, the cutting module will operate to select any flat film transiting, adjacent thereto, with an appropriate strategy.

These cutting systems, consisting of a plurality of individual modules, operate on the flanks of the film tube containing one or more bundles by carrying out cuts on the top and bottom of the final package.

The cutting systems of the prior art have significant moving masses and thus cannot reach high cutting rates. A cutting system structured according to the prior art, inserted into a packaging machine, limits the operating speed thereof, reducing the productivity thereof.

It is a general object of the present invention to provide a solution to the drawbacks mentioned above in relation to the prior art in a highly simple, cost-effective, and particularly functional manner.

It is another object of the present invention to provide a cutting unit for separating one or more bundles wrapped with a continuous wrap, or for cutting a flat film in dynamic transit, which has no significant masses to move for carrying out the cutting and therefore is quick and precise.

It is another object of the present invention to provide a cutting unit for separating one or more bundles wrapped with a continuous wrap, where the cutting unit consists of a plurality of cutting modules arranged on the periphery of the sides that identify the front section of the bundle, or for cutting a flat film in dynamic transit, using a single cutting module, in the presence of minimal or even almost absent frictions between the parts involved.

In addition, it is also an object of the present invention to identify a cutting unit for separating one or more bundles wrapped with a continuous wrap, or for cutting a flat film in dynamic transit, where the hot cutting wire is perfectly isolated from the rest of the machine in the absence of heat dispersion, avoiding the transmission thereof to the other operating parts.

The aforesaid objects are achieved by a cutting unit for separating one or more bundles wrapped with a continuous wrap, or for cutting a flat film in dynamic transit.

The structural and functional features of the present invention and the advantages thereof with respect to the prior art will become even clearer and more apparent from an examination of the following description, with reference to the accompanying diagrammatic drawings, which show an embodiment of the invention itself.

DETAILED DESCRIPTION OF THE INVENTION

Figure 1A:
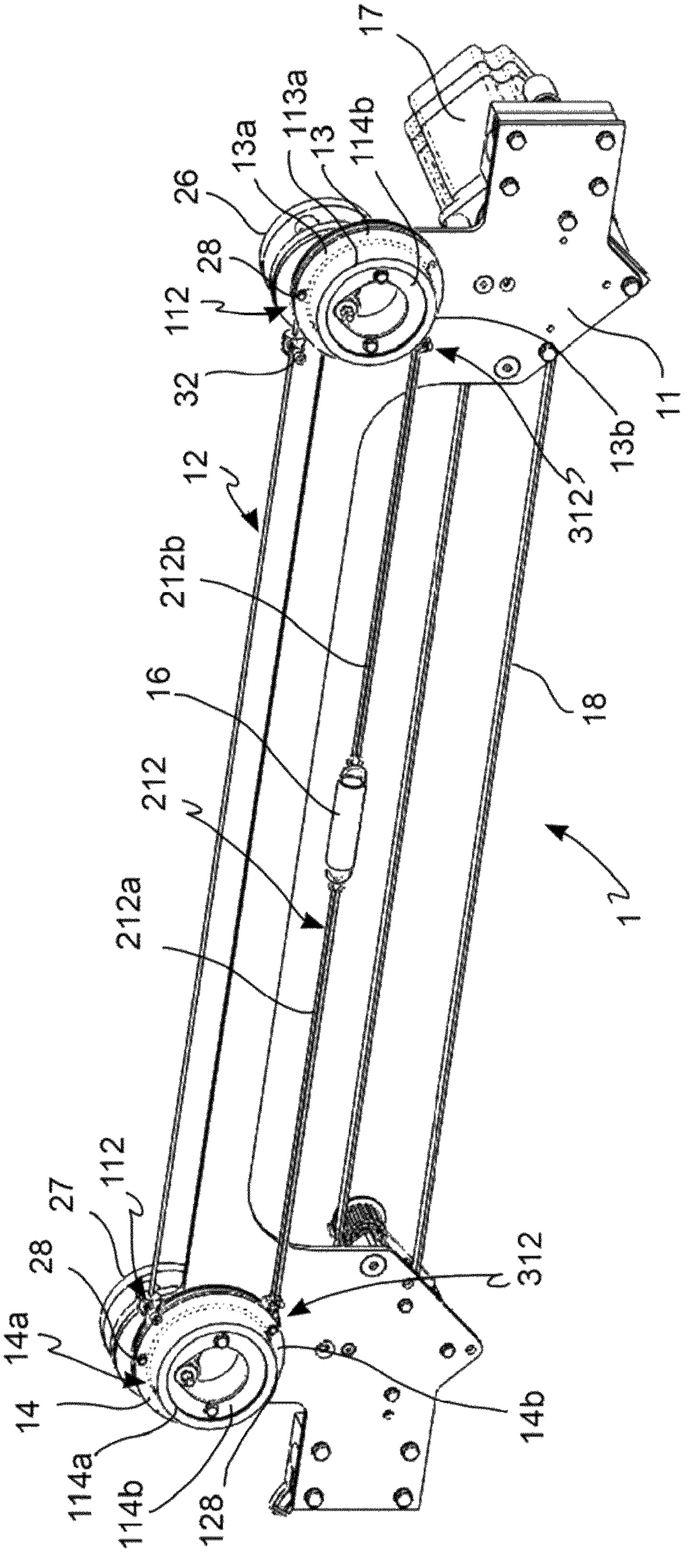
FIG. 1A shows a front perspective view of a cutting unit for separating the lower part of one or more bundles, moved by an overlying transport plane and wrapped with a continuous wrap or for cutting a flat film in dynamic transit, made according to the present invention.
Figure 1B:
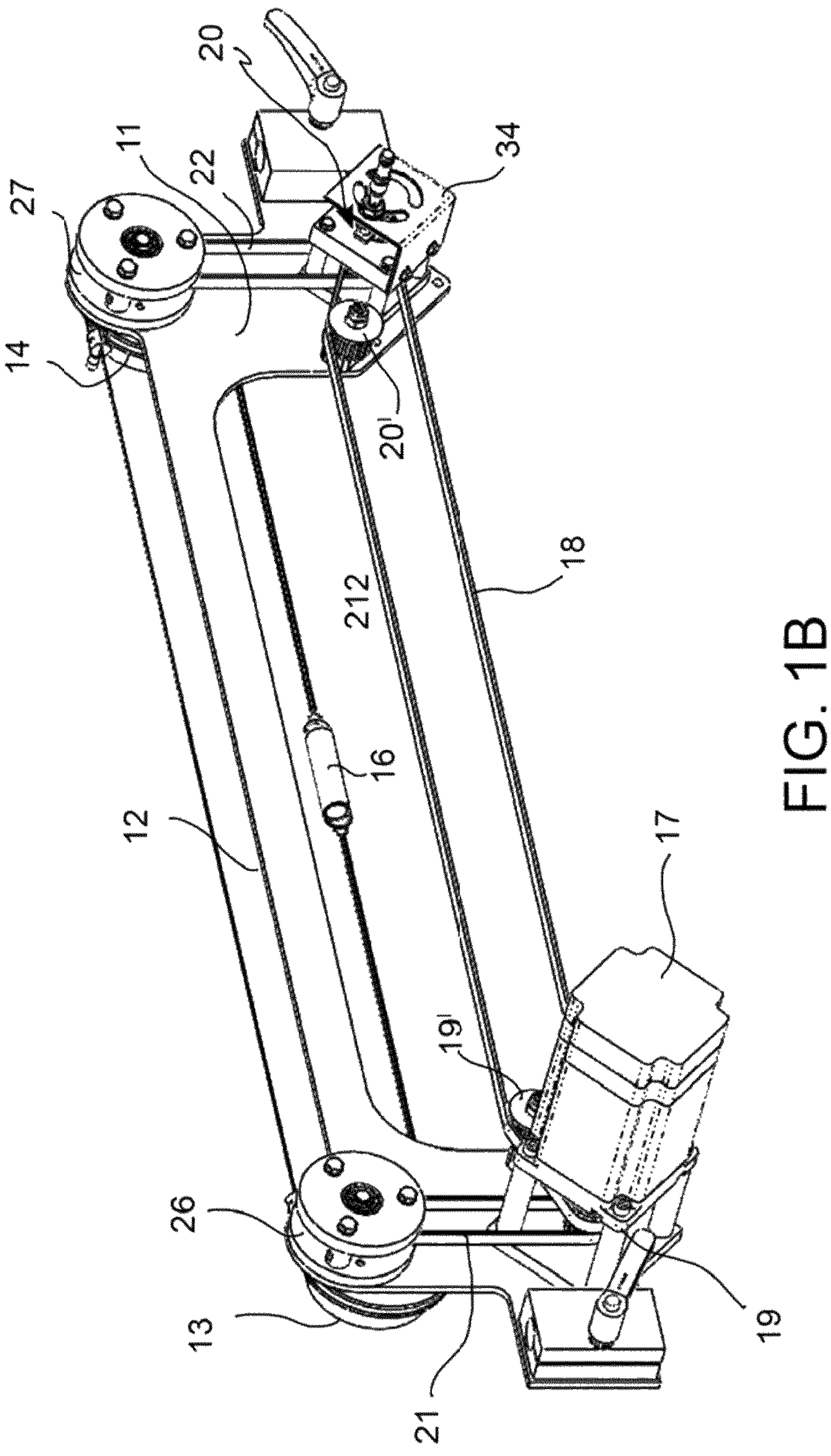
FIG. 1B is a rear perspective view of the cutting unit in FIG. 1A.

As usual, in the following description, the same reference numerals for illustrating the figures are used to indicate constructional elements with the same function. Moreover, for clarity of illustration, some reference numerals cannot have been repeated in all figures.

Indications such as "vertical" and "horizontal," "upper" and "lower" (in the absence of other indications) must be read with reference to the assembly (or operating) conditions and referring to the normal terminology in use in current jargon, where "vertical" indicates a direction substantially parallel to that of the gravity force vector "g" and horizontal indicates a direction perpendicular thereto.

With reference to the exemplary and non-limiting figures, there is shown an embodiment of a modular cutting unit for separating one or more bundles wrapped with a continuous wrap, or for cutting a flat film in dynamic transit, according to the present invention.

A modular cutting unit of this type is intended to make a cut on a continuous parcel C of one or more bundles or products in general F, whether in a tubular or similar classic shape with a circular, quadrilateral, etc. section or on a continuous parcel of reduced thickness. Moreover, the wrap which forms such a parcel can be of any type such as heat-shrinkable, extensible or more generally a plastic material.

A modular cutting unit 1 according to the invention comprises a load-bearing structure 11 on which an appropriately heated cutting wire 12 is arranged, which is fixed to two eccentric wheels 13, 14 and where the ends 112 of the cutting wire 12 are constrained, by pins 28, to a first circumferential portion 13*a*, 14*a* of said eccentric wheels 13, 14.

A tensioning wire 212 is in turn fixed, at the two ends 312 thereof, by respective pins 128, to a second circumferential portion 13*b*, 14*b* of the eccentric wheels 13, 14, so that an arc of a circle between the pins 28 of the first circumferential portion 13*a*, 14*a* and the pins 128 of the second circumferential portion 13*b*, 14*b* is less than 180° and preferably between 150° and 170°.

Figure 6:
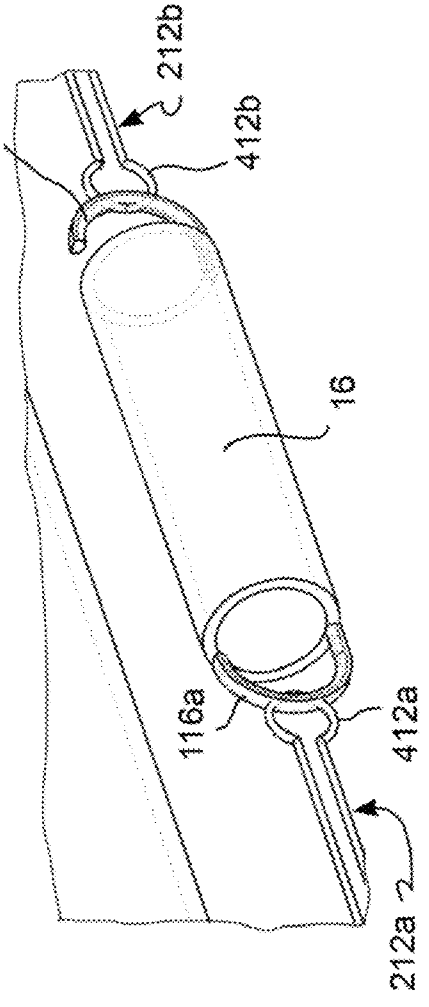
FIG. 6 shows a perspective view of the tensioning system of the cutting unit according to the invention.

The tensioning wire 212 comprises an elastic compensation element 16 along the length thereof. For that purpose, as better shown in FIG. 6, the tensioning wire 212 can consist of two pieces 212*a*, 212*b* ending at one end with an eyelet 412*a*, 412*b*. The elastic compensation element 16 (shown in simplified form as a cylinder, but which could typically be a helical spring) will in turn comprise two hooks 116*a*, 116*b* configured to be coupled to the eyelets 412*a*, 412*b* of the pieces 212*a*, 212*b* of the tensioning wire 212.

The elastic compensation element 16 will be appropriately calibrated so as to impart a tensioning force to the eccentric wheels 13, 14 such as to keep the cutting wire 12 under tension throughout the operating steps of the cutting unit.

The two eccentric wheels 13, 14 are arranged on opposite sides of the same load-bearing structure 11 and are hinged thereon. In the non-limiting example, the two eccentric wheels 13, 14 are placed along a long side of the load-bearing structure 11.

The eccentric wheels 13, 14 comprise an outer crown element 113*a*, 114*a*, to which said cutting wire 12 and said tensioning wire 212 are fixed, as previously described, and an eccentric central plate 113*b*, 114*b*, the outer crown element 113*a*, 114*a* being idly coupled, e.g., by bearings, to the central plate 113*b*, 114*b*.

The eccentric central plate 113*b*, 114*b* is fixed eccentrically to a respective shaft 36, which in turn is fixed to a respective actuation pulley 26, 27, which can be placed on the opposite side of the load-bearing structure 11.

A single motor 17 with a transmission allows moving the two eccentric wheels 13, 14 continuously and synchronously, as will be described below. Such a transmission comprises, for example, a first toothed belt 18 in a closed loop which is wound onto toothed pulleys 19, 20 and return pulleys 19', 20' arranged on opposite sides on the load-bearing structure 11. A drive pulley 19 is placed to be coaxial and integral with a shaft 117 of the motor 17 and such a belt 18 is wound thereon before being wound onto the further driven pulley 20 (the driven pulley 20 is not shown in the figures) passing onto said return pulleys 19', 20'. The position of the driven pulley 20 is adjustable with respect to the load-bearing structure 11 by means of an adjustment member 34, so as to appropriately tension the belt 18.

The two pulleys 19, 20 are placed vertically aligned with respect to the two actuation pulleys 26, 27 (i.e., along a direction substantially perpendicular to the unwinding direction of the belt 18) and cause the synchronous and continuous rotation thereof by means of two further driven belts 21, 22.

Figure 3:
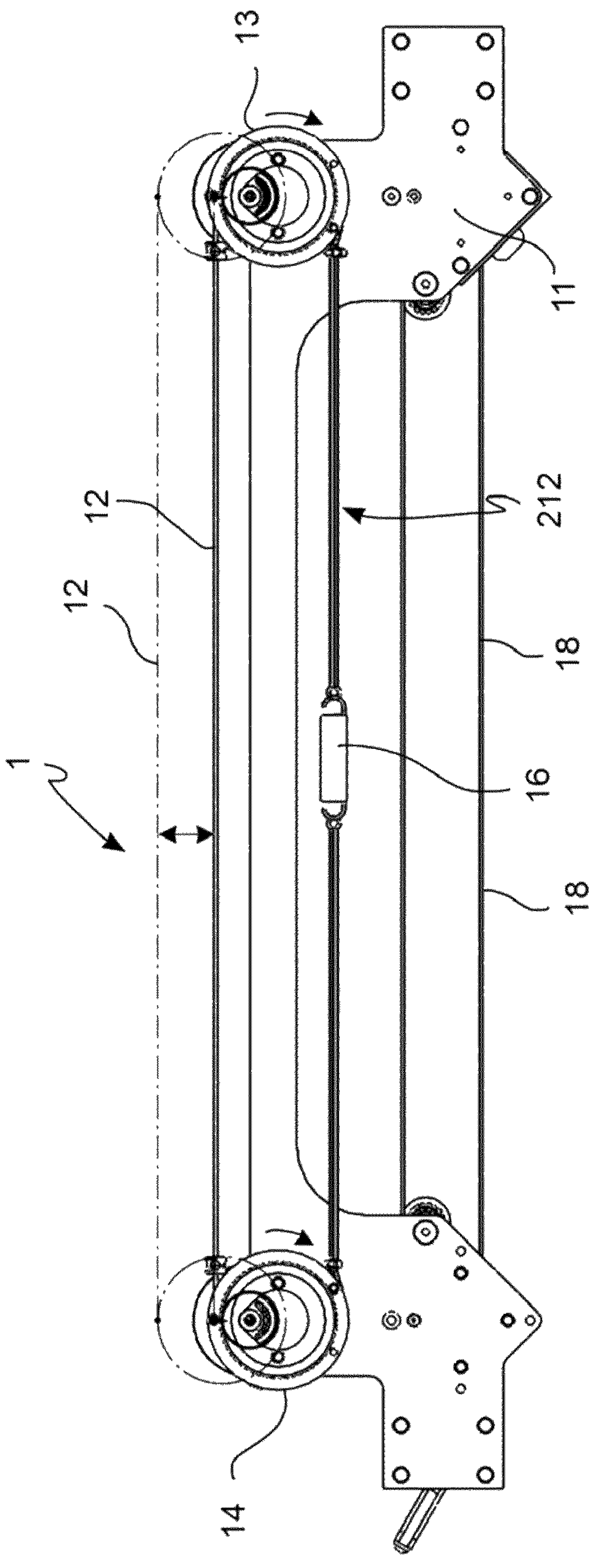
FIG. 3 shows a raised front view of the cutting unit in the cutting position, whereas the broken line partially shows the cutting unit in the disengagement position.

Since the outer crown element 113*a*, 114*a* is idly coupled to the eccentric central plate 113*b*, 114*b* and is retained by the cutting wire 12 and by the tensioning wire 212, and the eccentric central plate 113*b*, 114*b* is fixed eccentrically to the respective pulley 26, 27, the rotation of the latter causes the rotation of the eccentric central plate 113*b*, 114*b* and a substantially elliptical motion of the outer crown element 113*a*, 114*a*, which results in an alternate motion component of the cutting wire 12 perpendicular to the cutting wire 12, as shown in FIG. 3.

Figure 2A:
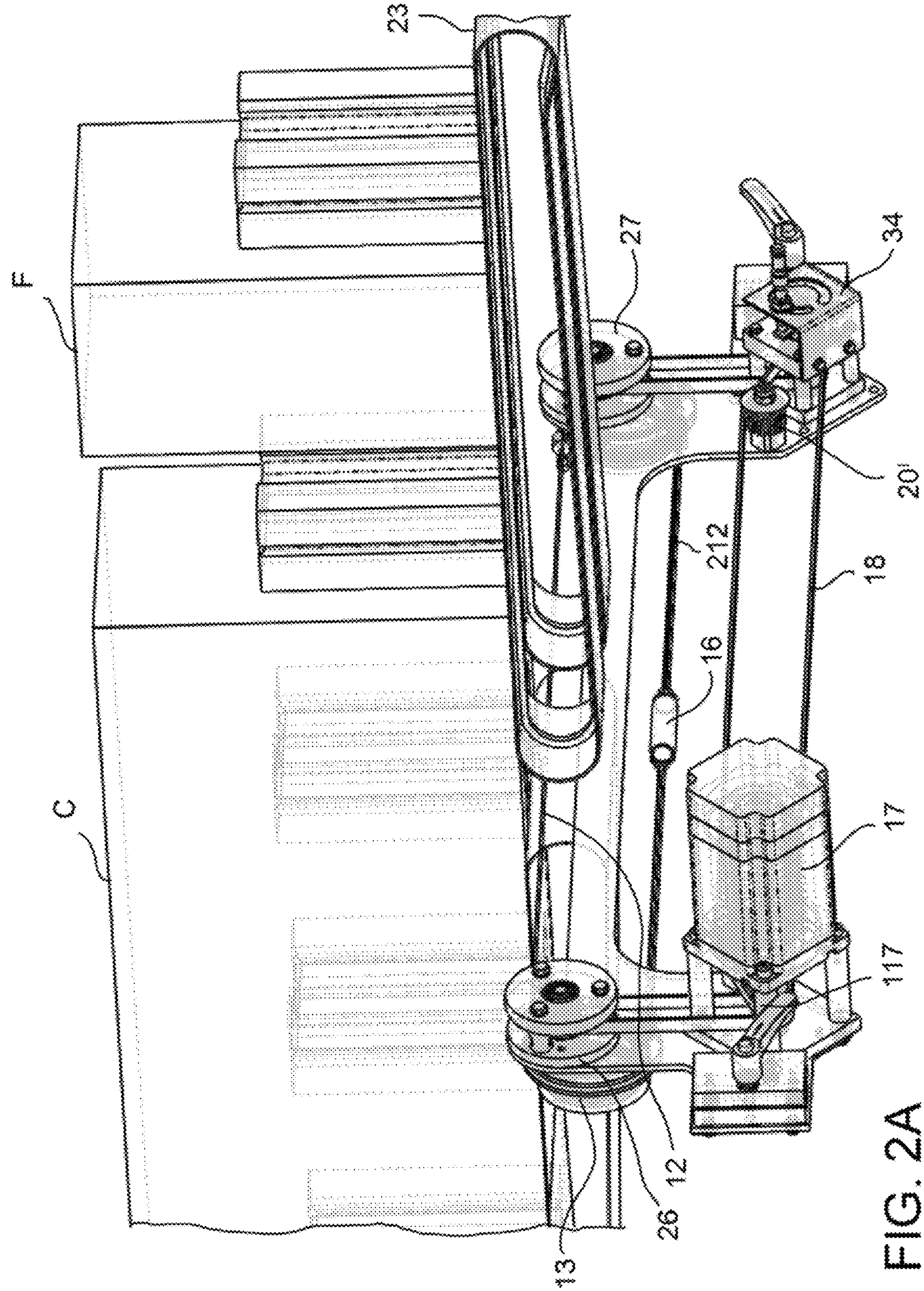
FIG. 2A shows a bottom perspective view of the cutting unit shown in FIG. 1 in which the overlying transport plane bearing the continuous parcel made of plastic material wrap is illustrated.
Figure 2B:
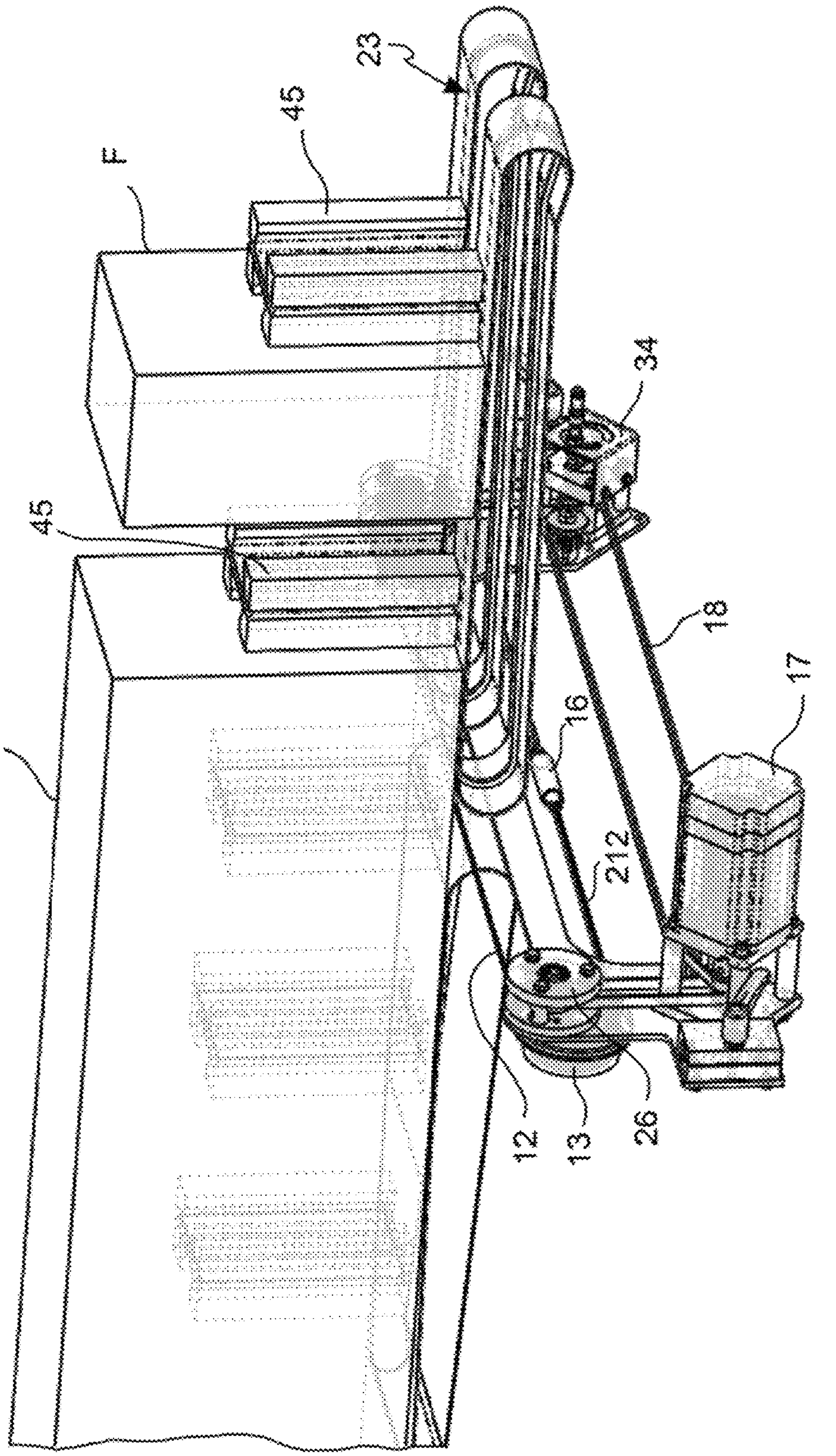
FIG. 2B shows a top perspective view of the depiction in FIG. 2A.

With reference to FIGS. 2A-2B, above the load-bearing structure 11, a continuous parcel C consisting of a plastic material wrap containing one or more products or objects for making bundles F is passed onto a sliding or transport plane 23. In other embodiments (not shown), the object to be cut will be a flat film made of a plastic material in dynamic transit. The cutting unit 1, placed below, is in fact used for cutting and separating the base of such a parcel C, or the entire section of the parcel when the latter is small in size, such as a flat film in dynamic transit, for example.

The vertical translation of the cutting wire 12 in a plane substantially perpendicular to such a parcel C, as previously described, brings the cutting wire 12 towards and engaged with and then immediately away and disengaged from the parcel C, causing the cutting of the wrap of the parcel C in the lower section.

When, as shown in the figures, it is necessary to singularize a bundle F from the parcel C, the cutting unit 1 will be arranged on all sides of a cutting assembly or system 101, where each of the cutting units 1 is placed parallel to the cutting plane to be carried out. For example, for a rectangular cutting section there will be four modular cutting sections, arranged two vertical and two horizontal on a frame 201, as shown by way of non-limiting example in FIGS. 7-10.

In this case, each cutting wire 12 of each cutting unit 1 is actuated by a single motor 17, with a belt transmission 18, 21 and 22 which allows the respective two eccentric wheels 13, 14 to be synchronously activated. In other words, each individual cutting unit 1 is provided with its own motor 17 which, synchronously with the other three motors of the other three cutting units being part of the cutting quadrilateral, allows making a perfectly synchronous cut on the same plane and on the four sides of the parcel C. Alternatively, it is also possible to offset each individual cut with positions depending on the shape of the parcel and create cutting geometries that can be variable within the section of the cut itself.

The system provides for a substantially alternate movement of the cutting wires 12, which move according to a main vector direction, reversing the direction of the orientation of the same vector. The cut is promoted by the cutting wire 12 being heated to a sufficiently high temperature to cause local melting or softening of the wrap around the parcel C.

Therefore, there is a plurality of four modular cutting units 1 each comprising a cutting wire 12 as described so far and forming a cutting assembly 101 for separating one or more bundles F wrapped with continuous wrap, or a single cutting unit 1 for cutting a flat film in dynamic transit.

Such a cutting wire 12 thus has an alternate movement, produced by means of a continuous rotary movement of the eccentric central plates 113*b*, 114*b* of the eccentric wheels 13, 14.

A fundamental advantage of the system described above is that it allows having high cutting rates since the only mass element, which moves alternately, is the cutting wire 12.

Note that the weight of the cutting wire 12 is absolutely negligible, whereas the structures which manage the alternate movement of the cutting wire are rotating structures; each cut implies one revolution of the transmission which manages the rotation of the eccentric central plates 113*b*, 114*b* of the eccentric wheels 13, 14 which activate the displacement of the cutting wire 12.

FIG. 3 shows with a solid line a first position in which the cutting wire 12 is arranged in a retracted position, whereas the advanced position or engagement and cutting position is shown with a broken line.

As can be seen below, this arrangement of the eccentric wheels in continuous rotation ensures a high-speed operation of the cutting unit.

As already mentioned, according to the present invention the cutting wire 12 is heated and, in fact, the invention introduces and suggests an innovative solution for the electrical connection of the cutting wire 12.

Figure 4:
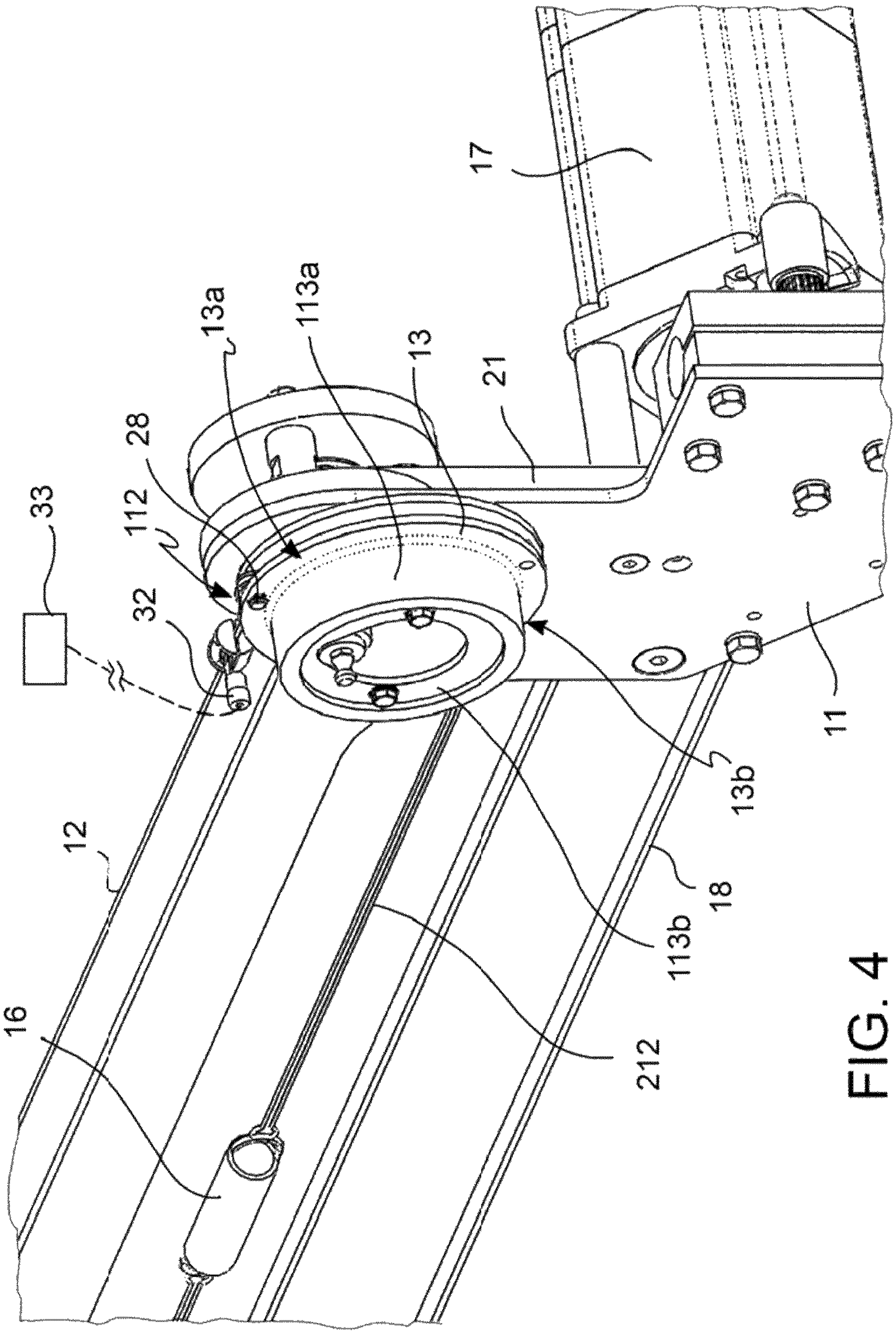
FIGS. 4 and 5 show part of the transmission between eccentric wheel and motor in both a perspective view and a partial section view.
Figure 5:
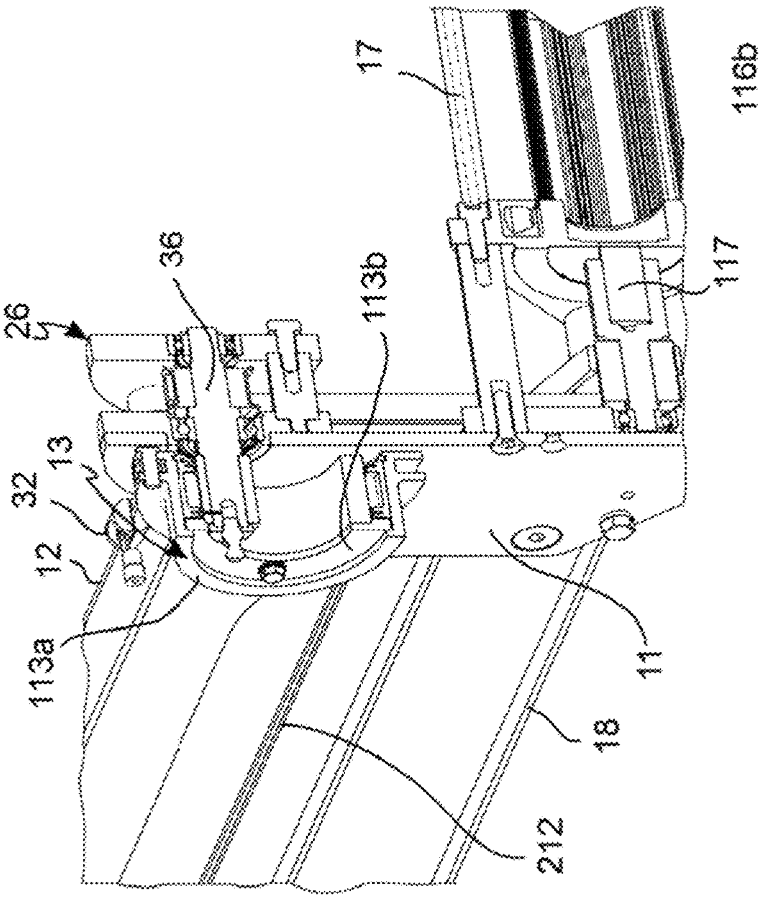

For that purpose, the terminal ends 112 of the cutting wire 12 are isolated from every other element of the cutting unit and are electrically connected to an external power supply, diagrammatically indicated by 33 (FIG. 4).

A terminal 32 is placed close to said ends 112, forming the connection towards the external electricity source. The thermal and electrical insulation towards the structure is ensured by the wheels 113*a*, 114*a* being made of and insulating material, e.g., a polymer material.

The tension of the cutting wire 12 is kept constant by virtue of the spring 16 of the tensioning wire 212, compensating for the thermal expansions of the cutting wire.

As described, thermal energy is supplied by intrinsic resistance exclusively to the cutting wire 12 and not to the structure.

A feature of the cutting unit 1 is that it consists of a limited number of components, is provided with an easy-to-make transmission, being characterized by the use of pulleys and belts which allow the synchronism of the two independent parts of the eccentric rotation of the two eccentric wheels 13, 14 bearing the cutting wire 12.

It is worth underlining which is the degree of freedom of movement and displacement that the cutting unit and wire have.

The geometric features certainly allow having a very high cutting rate without generating any stress on the structure.

As for the aspect of the energy management of the masses on the oscillating elements, this system has the mass of the cutting wire as the only mass element, from the point of view of the alternating movement, amounting to a few grams, which in terms of energy only involves a few joules of energy to manage.

Although not totally excluded, the stress of the cutting wire 12 is very limited, such as not to cause the mechanical breakage of the cutting wire as often occurs in similar elements.

Figure 7:
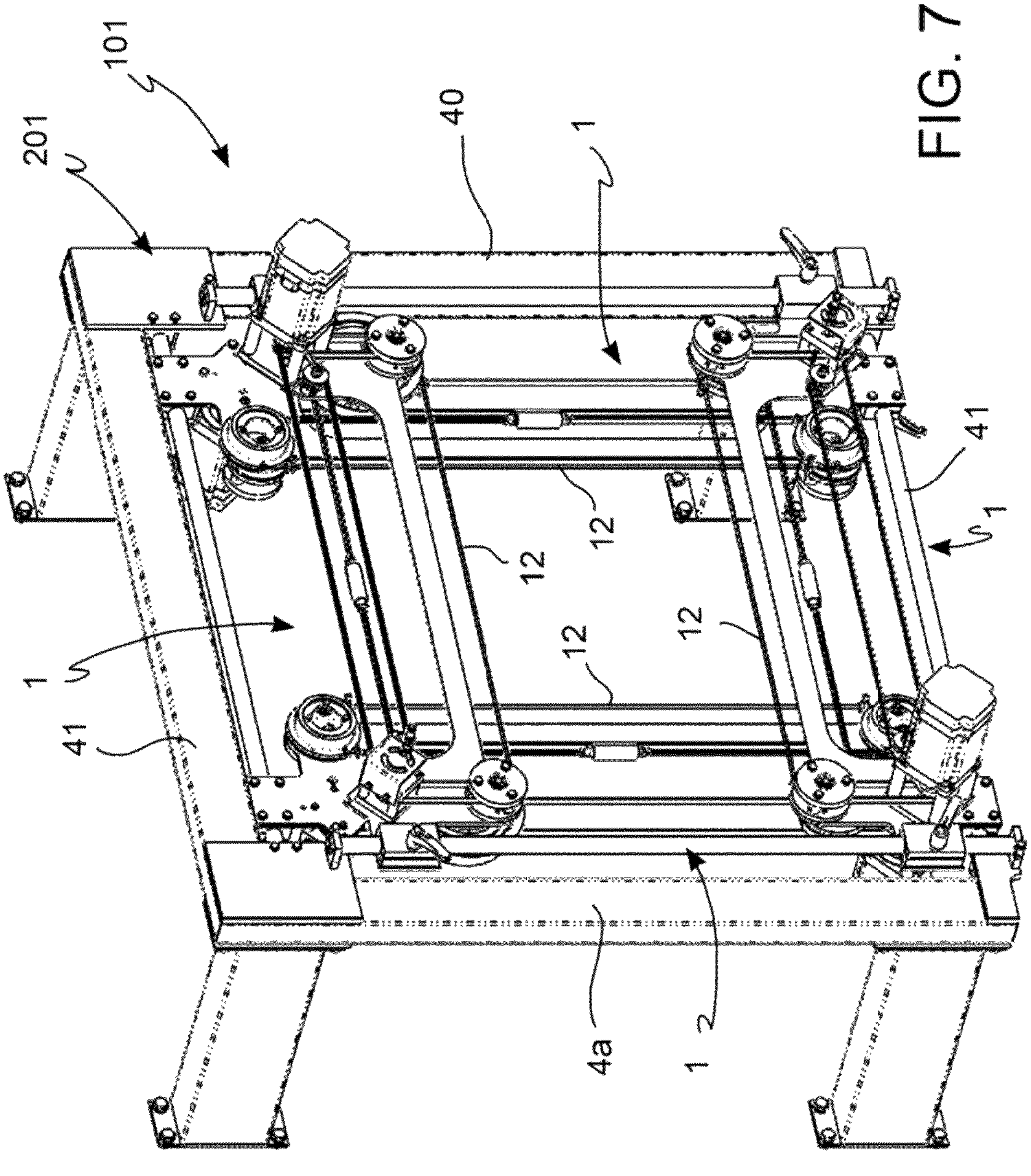
FIG. 7 shows a perspective view of an application of several cutting units in a machine which makes packages of bundles operating on four sides of a continuous parcel.
Figure 8:
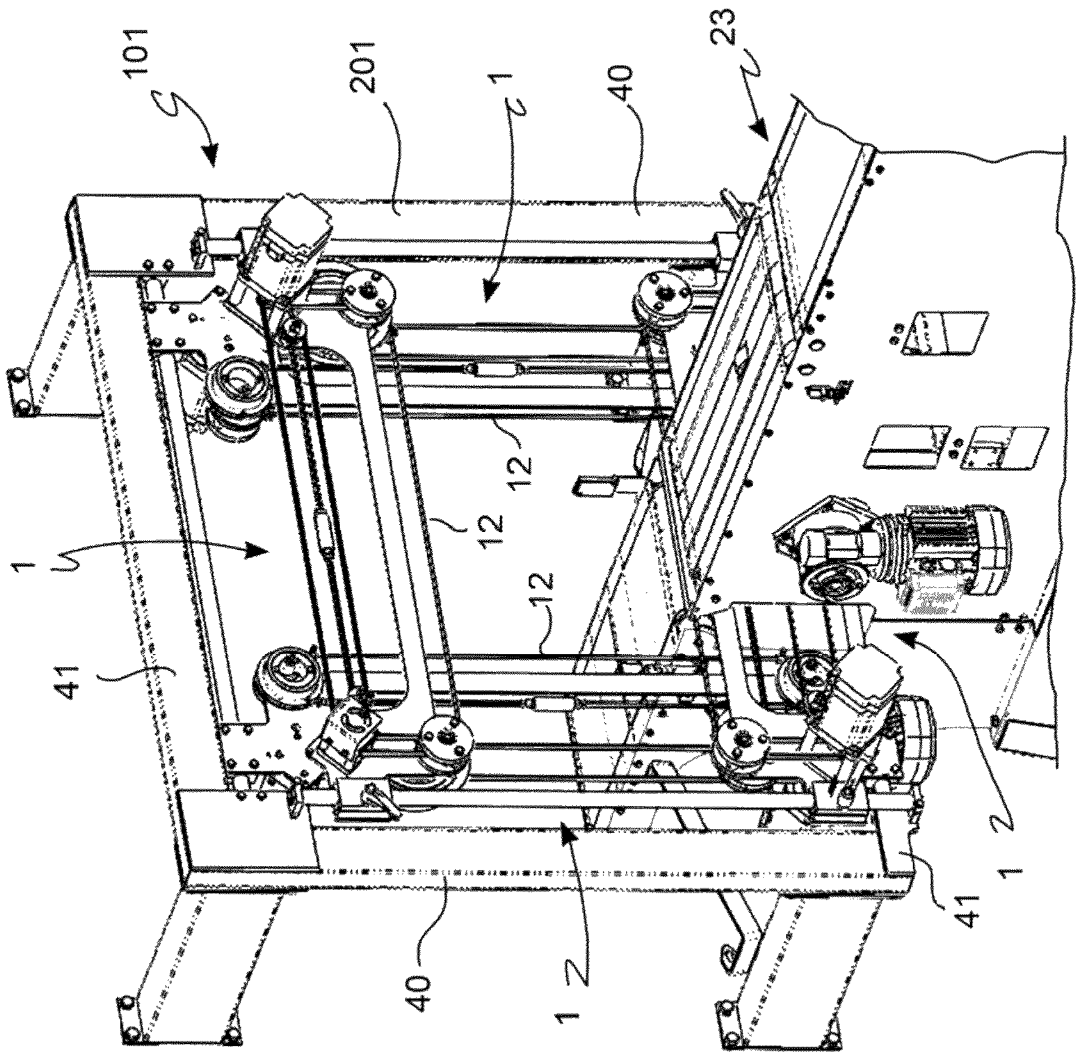
FIG. 8 shows a perspective view of the cutting units in FIG. 7 operating at a conveyor which passes through and inside them.
Figure 9:
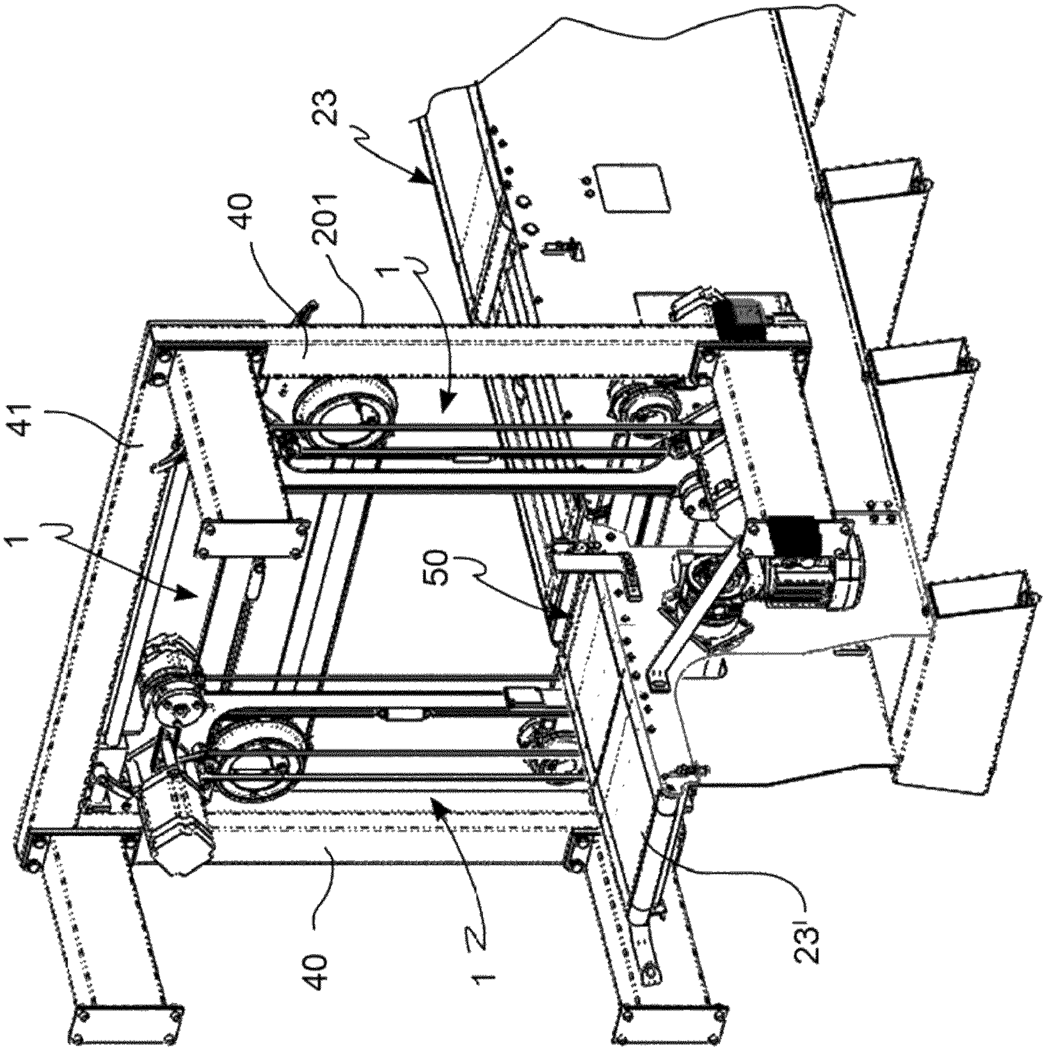
FIG. 9 shows the view in FIG. 8 from the opposite side.
Figure 10:
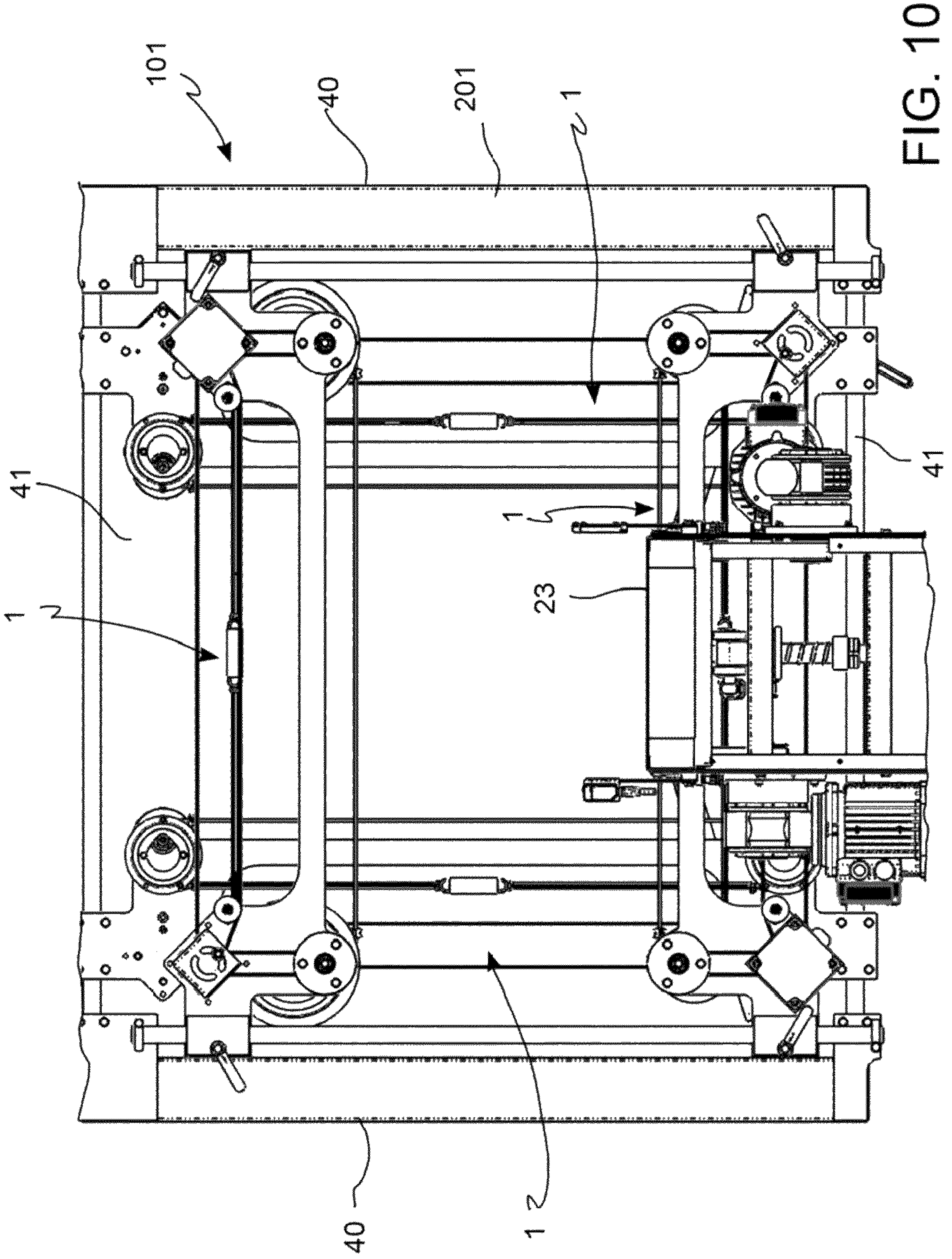
FIG. 10 shows an enlarged front view of the several cutting units shown in FIGS. 7, 8 and 9.

Returning to the example as shown for illustrative and non-limiting purposes in FIGS. 7—for a rectangular cutting section, there are four modular cutting sections, arranged two vertical and two horizontal.

In particular, FIGS. 7-10 show how the individual cutting unit 1 is arranged slidingly along vertical uprights 40 or horizontal uprights 41 of a frame 201 positionable as a function of the shape and size of the parcel C on which the peripheral cut is to be made.

In order to also allow the lower cutting wire 1 to act on the wrap of the parcel C, the transport plane 23 stops at the frame 201, creating a gap 50, to then start again with a conveyor belt 23' downstream of the cut.

The motors 17 of the various cutting units 1 will be appropriately synchronized to carry out their action simultaneously where required.

Figure 12:
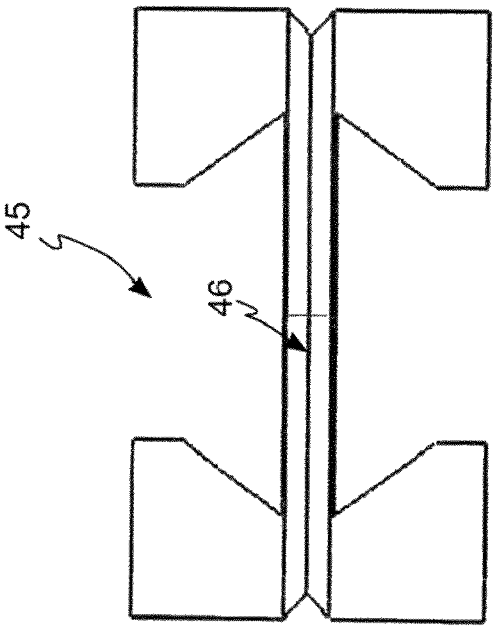
FIGS. 11 and 12 show a perspective view and a view along direction A, respectively, of a separator element or "godet" used in cooperation with the cutting units shown in FIGS. 7-9.
Figure 11:
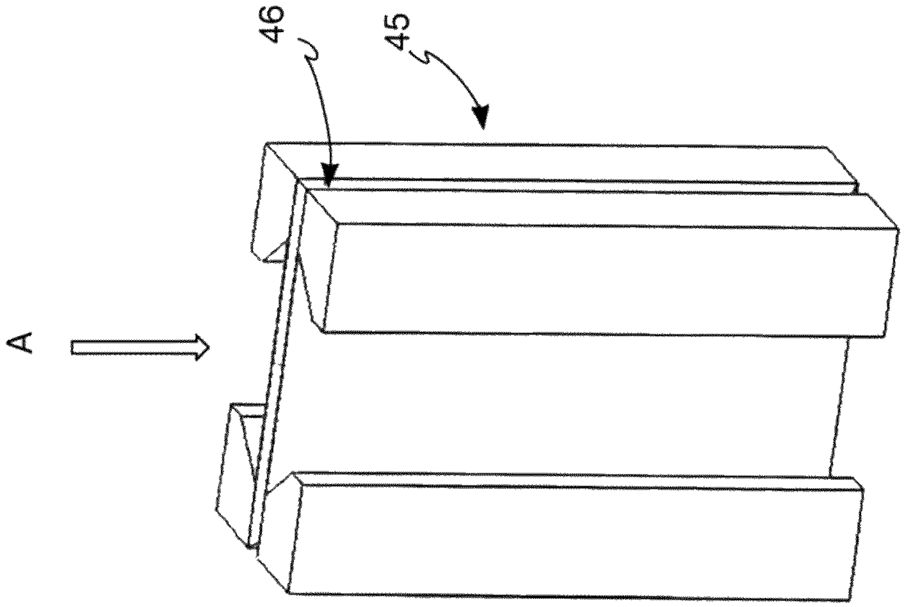

In addition, FIGS. 11 and 12 show a perspective view and a top plan view, respectively, of a separator element or "godet" 45 used in cooperation with the cutting units shown in FIGS. 7-10.

Such a separator element 45 is arranged in the parcel C between successive bundles F, spacing them apart and allowing easier insertion of the wire 12 on the edge of the individual cutting unit. For that purpose, it includes a peripheral recess 46 in which the four cutting wires 12 of the cutting units 1 can be inserted.

Moreover, the spacing between one bundle F and the next one allows the wrap around the parcel 1 to partially close on the front and rear sides of the bundle F, thus allowing better containment of the objects therein.

Once the parcel C has been cut, the separator elements 45 is retrieved and used again between two successive bundles F.

The invention claimed is:

1. A cutting unit for separating one or more bundles wrapped with a continuous wrap or for cutting a flat film in dynamic transit, comprising a load-bearing structure which operatively supports:

two eccentric wheels, wherein said two eccentric wheels are hinged on opposite sides of the load-bearing structure and comprise an outer crown element and an eccentric central plate, the outer crown element being idly coupled to the eccentric central plate;

a heated cutting wire having two ends, the cutting wire being fixed at the two ends onto said outer crown element by pins, at a first circumferential portion of said eccentric wheels;

a tensioning wire having two ends and comprising an elastic compensation element along a length of the tensioning wire, the tensioning wire being fixed at the two ends onto said outer crown element by pins, at a second circumferential portion of the eccentric wheels, so that an arc of a circle between the pins of the first circumferential portion and the pins of the second circumferential portion is less than 180°;

wherein said eccentric central plate of said eccentric wheels is eccentrically fixed to a respective shaft, which is fixed to a respective actuation pulley, said actuation pulleys being continuously and synchronously rotated to impart to said eccentric wheels an alternate motion component in a plane substantially perpendicular to a surface to be cut of said continuous wrap or flat film, between an engagement position with said continuous wrap or flat film, and a disengagement position from said continuous wrap or flat film.

2. The cutting unit according to claim 1, wherein said actuation pulleys are continuously and synchronously rotated by a single motor through a transmission system.

3. The cutting unit according to claim 2, wherein said transmission system comprises a first toothed belt in a closed loop which is wound onto toothed pulleys arranged on opposite sides on the load-bearing structure, wherein a drive pulley is coaxial and integral with a shaft of the motor and the first toothed belt is wound on the drive pulley before being wound onto a further driven pulley, and wherein the toothed pulleys are aligned with respect to two actuation pulleys along a direction substantially perpendicular to an unwinding direction of the toothed belt and cause synchronous and continuous rotation of the actuation pulleys by two further driven belts.

4. The cutting unit according to claim 1, wherein terminal ends of the cutting wire are isolated from every other element of the cutting unit and are electrically connected to an external power supply by terminals.

5. A cutting assembly comprising a plurality of the cutting units according to claim 1, configured and positioned at a transport plane for cutting all surfaces of a continuous wrap wrapped around a continuous parcel in transit through said cutting assembly, to separate a plurality of bundles.

6. The cutting assembly according to claim 5, comprising four cutting units slidingly arranged on vertical and horizontal uprights of a frame, wherein each cutting unit is placed in a positionable manner as a function of shape and size of the continuous parcel on which a peripheral cut is to be made.

7. A method for separating one or more bundles wrapped with a continuous wrap or for cutting a flat film in dynamic transit, comprising:

providing the cutting assembly according to claim 5;

transiting the continuous parcel arranged on the transport plane through said cutting assembly;

synchronously actuating said cutting units for separating said bundles from said continuous parcel.

8. The method according to claim 7, wherein said bundles transit on said transport plane in a spaced-apart position.

9. The method according to claim 8, wherein said bundles are spaced apart by a separator element.

10. The cutting unit according to claim 1, wherein the arc of a circle between the pins of the first circumferential portion and the pins of the second circumferential portion is between 150° and 170°.

* * * * *